US009635077B2

United States Patent
Swaminathan et al.

(10) Patent No.: US 9,635,077 B2
(45) Date of Patent: Apr. 25, 2017

(54) LOW LATENCY LIVE VIDEO STREAMING

(71) Applicant: Adobe Systems Incorporated, San Jose, CA (US)

(72) Inventors: Viswanathan Swaminathan, Saratoga, CA (US); Sheng Wei, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 379 days.

(21) Appl. No.: 14/213,127

(22) Filed: Mar. 14, 2014

(65) Prior Publication Data
US 2015/0264096 A1 Sep. 17, 2015

(51) Int. Cl.
| | | |
|---|---|---|
| *H04L 29/06* | (2006.01) | |
| *H04L 29/08* | (2006.01) | |
| *H04N 21/2187* | (2011.01) | |
| *H04N 21/643* | (2011.01) | |
| *H04N 21/654* | (2011.01) | |
| *H04N 21/845* | (2011.01) | |

(52) U.S. Cl.
CPC ........ *H04L 65/4084* (2013.01); *H04L 65/608* (2013.01); *H04L 65/80* (2013.01); *H04L 67/02* (2013.01); *H04N 21/2187* (2013.01); *H04N 21/643* (2013.01); *H04N 21/654* (2013.01); *H04N 21/8456* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0236387 A1* | 10/2006 | Ballinger | ................ | H04L 63/08 726/14 |
| 2010/0180011 A1* | 7/2010 | Sood | ........................ | G06F 15/16 709/219 |
| 2011/0080940 A1* | 4/2011 | Bocharov | .......... | H04N 21/4331 375/240.01 |
| 2013/0132507 A1 | 5/2013 | Swaminathan et al. | | |

(Continued)

OTHER PUBLICATIONS

"SPDY: An experimental protocol for a faster web," retrieved from URL: http://www.chromium.org/spdy/spdy-whitepaper, on Mar. 6, 2014, 5 pages.

(Continued)

*Primary Examiner* — Chris Parry
*Assistant Examiner* — Caroline Jahnige
(74) *Attorney, Agent, or Firm* — Finch & Maloney PLLC

(57) ABSTRACT

Techniques are disclosed for low latency live video streaming. A client can be configured to send a single HTTP request for live video streaming to a server. The server can be configured to push one or more video segments to the client in response to the request, following a pre-defined push strategy. For example, using a so-called all-push strategy, the client sends only one request to the server, and in response, the server sends all of the video segments to the client as soon as each segment is complete. The HTTP 2.0 protocol may be used for pushing the video from the server to the client. This technique eliminates the request explosion problem when small segments are used. Further, the number of segments pushed with each request can be varied, which is to facilitate adaptive bitrate switching.

16 Claims, 7 Drawing Sheets

(56) References Cited

U.S. PATENT DOCUMENTS

2014/0297813 A1* 10/2014 Gomes .................. H04N 19/196
                                                               709/219

OTHER PUBLICATIONS

"Hypertext Transfer Protocol Bis (httpbis)—Charter," retrieved from URL: https://datatracker.ietf.org/wg/httpbis/charted, on Mar. 6, 2014, 3 pages.

Belshe, et al., "SPDY Protocol draft-ietf-httpbis-http2-00," HTTPbis Working Group, Nov. 28, 2012, retrieved from URL: https://tools.ietf.org/html/draft-ietf-httpbis-http2-00, on Mar. 6, 2014, 47 pages.

Swaminathan, "Are We in the Middle of a Video Streaming Revolution?" ACM Transactions on Multimedia Computing, Communications and Applications, vol. 9, No. 1s, Article 40, publication date: Oct. 2013, 6 pages.

Mitra, et al. , "An Optimal Client Buffer model for Multiplexing HTTP Streams," Multimedia Signal Processing (MMSP) 2012, pp. 283-288.

Pantos, et al., "HTTP Live Streaming," retrieved from URL: http://tools.ietf.org/html/draft-pantos-http-live-streaming-11, on Mar. 6, 2014, pp. 1-38.

Swaminathan, et al., "Low Latency Live Video Streaming Using HTTP Chunked Encloding," Multimedia Signal Processing (MMSP) 2011, 6 pages.

"Live video streaming online—HTTP Dynamic Streaming," retrieved form URL: http://www.adobe.com/products/hds-dynamic-streaming.html, on Mar. 6, 2014, 1 page.

"Information technology-Dynamic adaptive streaming over HTTP (DASH)," International Standard, ISO/IEC 23009-1, Apr. 1, 2012, 134 pages.

"Media Source Extensions," retrieved from URL: https://dvcs.w3.org/hg/html-media/raw-file/tip/media-source/media-source.html, on Mar. 6, 2014, pp. 1-39.

Cardaci, et al., "Performance Evaluation of SPDY over High Latency Satellite Channels," PSATS 2013, LNICST 123, Institute for Computer Sciences, Social Informatics and Telecommunications Engineering, 2013, pp. 123-134.

Mineki, et al., "SPDY Accelerator for Improving Web Access Speed," ICACT, Jan. 27-30, 2013, pp. 540-544.

Padhye, et al., "A comparison of SPDY and HTTP performance," retrieved from URL: http://citeseerx.ist.psu.edu/viewdoc/download?doi=10.1.1.252.8337&rep=rep1&type=pdf on Mar. 12, 2014, 9 pages.

Mueller, et al., "Dynamic Adaptive Streaming over HTTP/2.0," retrieved from URL: http://www-itec.uni-klu.ac.at/bib/files/paper_330.pdf on Mar. 13, 2014, 6 pages.

"GPAC DashCast," retrieved from URL: http://gpac.wp.mines-telecom.fr/dashcast/ 1/ on Mar. 6, 2014, 5 pages.

"Jetty-Servlet Engine and Http Server," retrieved from URL: http://www.eclipse.org/jetty/ on Mar. 6, 2014, 2 pages.

"Dash-Industry-Forum/dash.js," retrieved from URL: https://github.com/Dash-Industry-Forum/dash.js on Mar. 6, 2014, 2 pages.

"The Chromium Projects," retrieved from URL: http://www.chromium.org/Home on Mar. 6, 2014, 1 page.

* cited by examiner

LOW LATENCY LIVE VIDEO STREAMING

FIELD OF THE DISCLOSURE

This disclosure relates generally to the field of digital media distribution, and more particularly, to techniques for low latency live video streaming.

BACKGROUND

Streaming video is a form of multimedia that is presented to a user while being delivered by a provider, as distinguished from simple file transfer, which involves receiving the entire video content before playing it back. Hypertext Transfer Protocol (HTTP) has been adopted as a scalable and efficient protocol for streaming video content via the Internet. HTTP Live Streaming (HLS), HTTP Dynamic Streaming (HDS), and Dynamic Adaptive Streaming over HTTP (DASH) are examples of existing techniques for streaming multimedia from HTTP web servers. The video content is divided into a series of file segments. Using these protocols, each segment is delivered individually. For instance, with existing HTTP streaming techniques, the segments have fixed intervals, and each segment is regarded as a separate resource for HTTP requests and responses. As a result, the video content cannot be delivered and played back until the entire fixed-interval video segment it belongs to is fully generated. Latency in live video streaming (e.g., from a live sporting event) is generally the time difference between when the live event happens and when it is played back to the user. Therefore, the latency is at least the duration of one video segment interval, and is subject to additional buffering and network delays. Often, each segment is at least several seconds long, which can result in a latency of several tens of seconds. Such delays are undesirable, particularly in time-critical live streaming scenarios.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
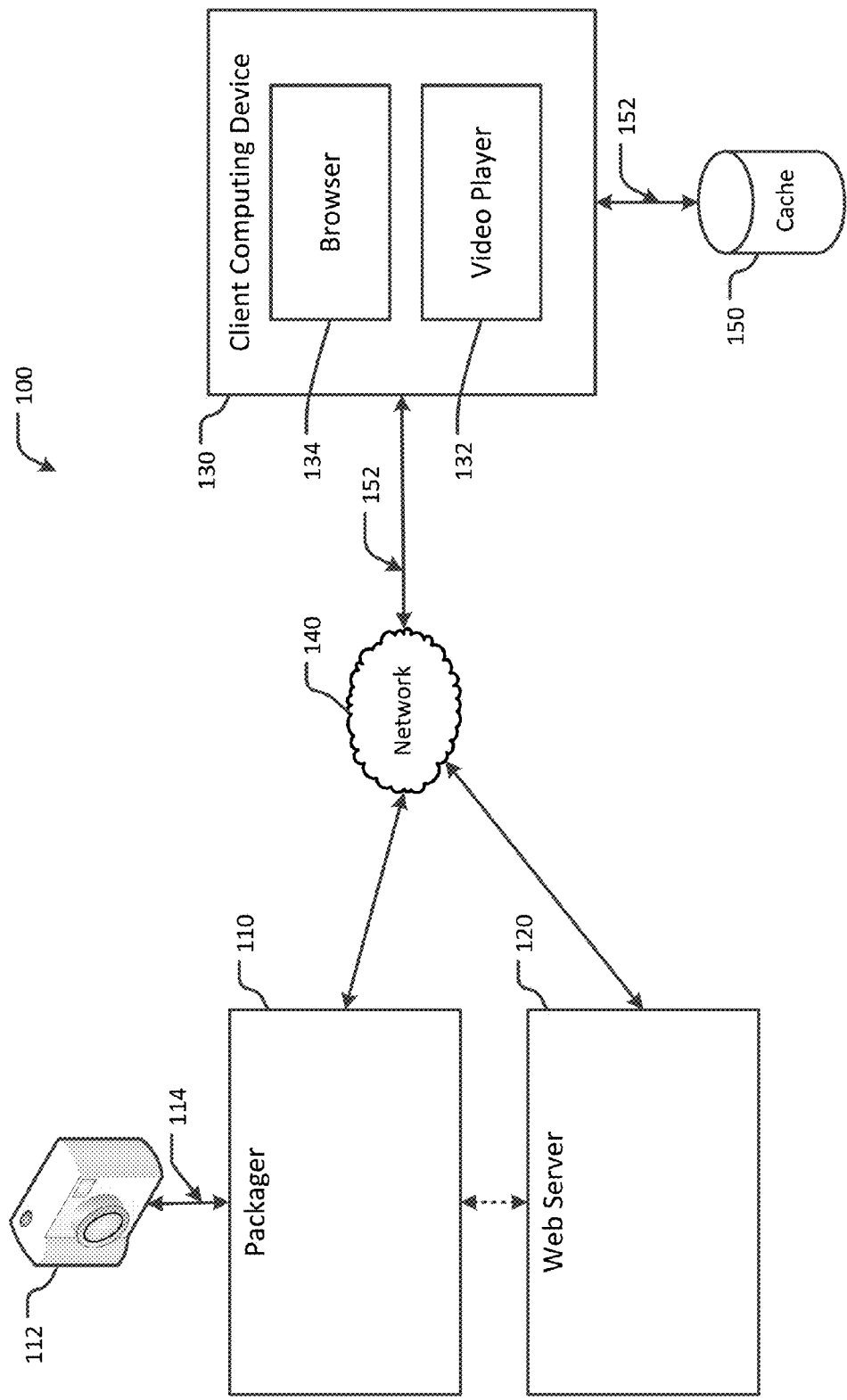
FIG. 1 illustrates an example client-server system for low latency live video streaming, in accordance with an embodiment of the present invention.

As noted above, HTTP streaming has been adopted as a scheme for delivering video content over the Internet. This is due in part to the ubiquity and scalability of HTTP servers or caches. HTTP is a stateless communication protocol. Generally, a stateless protocol is a communications protocol that treats each request for information as an independent transaction that is unrelated to any previous request so that the communication consists of independent pairs of requests and responses. There are several types of video streaming services, including live video streaming. Live video streaming is the delivery of video of a live event, such as sports games. Ideally, such live streaming occurs in real-time (in which there is virtually no delay) or near real-time (in which the delay is not significant) as the content is generated. Thus, for live video streaming, the video streaming solution should have a relatively low latency. However, existing HTTP video streaming techniques are not suitable for low latency applications, such as live video streaming, because the segmentation of video content introduces at least one segment delay between the server and the client as each segment is individually packaged, requested and fulfilled. One solution for reducing the latency is to reduce the length of each segment. However, a consequence of reducing the segment length is that the number of segments increases proportionally (e.g., halving the segment length doubles the total number of segments). Since each segment is treated as a separate resource, the number of HTTP requests issued by the client increases with the number of segments. For example, for a sixty-second live event, if the segment duration is four seconds, there will be fifteen request/response pairs in total. However, if the segment duration is reduced to one second, the number of request/response pairs will grow to sixty. Accordingly, very small segment durations can lead to an explosion in the number of HTTP requests and responses. Since each request and response imposes additional processing overhead to the client, server and the network infrastructure, this simple solution cannot obtain a sufficient amount of latency reduction.

To this end, techniques are disclosed herein for low latency video streaming. According to an embodiment of the present invention, a client can be configured to send a single request for live video streaming to a server. The server can be configured to send, or push, one or more video segments to the client following a pre-defined push strategy. For example, using a so-called all-push strategy, the client sends only one request to the server, and in response, the server pushes all of the video segments to the client as soon as each segment is complete. Other push strategies, such as those described in further detail below, can be used. The video segments can be pushed utilizing a stateless communication protocol, such as HTTP 2.0. This technique eliminates the request explosion problem when small segments are used. Further, the number of segments pushed with each request can be varied in some embodiments, so as to provide a way for clients to switch to the appropriate bitrate segments while controlling any additional overhead. Numerous configurations and variations will be apparent in light of this disclosure.

As used herein, the terms "content" and "multimedia content" include audio, video, still photographs, data, graphics, or any other information that can be identified, addressed, referenced or handled in any networked information system, such as the World Wide Web, or any information that can be delivered from a publisher to an end-user via physical media, such as a portable USB drive, CD, DVD or Blu-ray disc. In general, content includes any form of information in digital form; however, content may be embodied in non-digital forms (e.g., analog) or a combination of digital and non-digital forms. The term "video," as used herein, is intended to include all types of multimedia content.

HTTP 2.0, as referred to herein, is a version of the HTTP communications protocol used, for example, by the World Wide Web. HTTP 2.0 is standardized by the Internet Engineering Task Force (IETF) using SPDY™ by Google, Inc. as a starting point. In comparison to, e.g., HTTP 1.1, HTTP 2.0 enables a more efficient use of network resources and a reduced perception of latency by using header field compression and allowing multiple concurrent messages on the same connection. HTTP 2.0 also supports unsolicited pushes of data from servers to clients. However, HTTP 2.0 is not designed for video streaming applications, and the server push mechanism cannot be directly adopted for video streaming. To this end, the techniques disclosed herein allow for HTTP 2.0 server push based delivery of live video streaming applications, including those that employ, e.g., HDS-, HLS- and DASH-based clients.

As used herein, the terms "push" and "server push" generally refers to a network-based communication where live video segments can be actively pushed from a web server to a client as segments become available without requiring separate HTTP requests from the client for each segment. In one particular example embodiment provided herein, a live server push strategy pushes multiple video segments after receiving a single request. In this way, a low latency live streaming experience can be achieved by reducing the segment duration without incurring the highly increased request overhead of multiple requests. A push service is in contrast to a pull service, where the transmission of each and every segment is initiated by a separate request from the receiver of the data (e.g., a client of the server). One example of a push service that can be exploited as provided herein is a HTTP 2.0 server push, which generally includes sending unsolicited, or asynchronous, data from a web server to a web browser. As will be appreciated in light of this disclosure, a web server providing a live video content push service does not necessarily have to terminate a connection with a client after a first segment of live video data has been pushed to the client. Instead, the web server may leave the connection open so that if an event occurs (new content becomes available) it can be sent out immediately using the existing connection.

Existing versions of HTTP-based video streaming techniques, including HLS, HDS, Smooth Streaming and DASH, were not designed or optimized for use with the server push feature of HTTP 2.0. Thus, and in accordance with an embodiment, a technique for live video streaming is provided that uses a live server push strategy in a stateless communication protocol, such as HTTP 2.0. The live video content is broken into a sequence of HTTP-based file segments. Each segment contains a short interval of playback time (e.g., on the order of seconds) of video content that is potentially many minutes or hours in duration, such as the live broadcast of a sports event. The push server receives a push marker request from a video client (e.g., a DASH client) to determine which segments to push. The push marker may, for example, be included in a lightweight GET request that indicates the start and end segment numbers that the video client is requesting. The video client can send the push marker request at certain times determined by a given low latency push strategy with which it is associated. Once the pushed video segments are received by the video client's HTTP stack, they can be played back or, additionally and alternatively, be stored in a cache (e.g., client). Then, when the video client is ready to play back the already pushed content, it can obtain that content from the cache without having to send another request out to the push server.

In accordance with another embodiment of the present invention, a methodology is provided for video streaming using a server push scheme that is supported by HTTP 2.0. In particular, the method includes reducing the segment size of the video stream according to a given push strategy until the desired latency is achieved, while considering the effects of overhead and supporting dynamic bitrate switching. The push strategy can include a no-push, all-push, or k-push strategy. A no-push strategy is one in which the client sends an HTTP request for each video segment and the server responds to each request by sending the corresponding segment to the client. An all-push strategy is one in which the client issues only one request for the entire live video stream and the server responds to the request by actively pushing each video segment as it becomes available. A k-push strategy in one in which the client issues a request for k video segments and the server responds to the request by pushing up to k segments as each segment becomes available. Varying k in the k-push can be used to ensure that the client has the appropriate ability to switch to a different bitrate/resolution, if desired. The switching can be done at the client by sending the next HTTP request for a different bitrate/resolution of the video segment. By configuring the k value, the ability and overhead (e.g., switching delay) of the client can be controlled. In some embodiments, two or more different push strategies may be combined for a given live video stream; for example, using a k-push strategy for some period of time, followed by an all-push strategy or a no-push strategy. Other push strategies and combinations thereof may be employed and will be apparent in light of this disclosure.

In some embodiments, the content can be made available for delivery from the push server to the client at a variety of different bitrates and resolutions so as to emulate the dynamic bitrate switching aspect of HTTP Streaming or adaptive bitrate streaming. In one such embodiment, as the content is played back by a video client, the push server automatically determines the appropriate bitrate for the next segment based on current network conditions (e.g., changes in available or usable bandwidth). For example, the push server may select the lowest bitrate and hence the smallest possible segment that can be downloaded in time for playback without causing stalls or re-buffering events, which would interrupt the playback, or otherwise increase the playback latency. The switching decision can be made by the client dynamically as the client is monitoring its network condition. Once the client determines to switch to a different bitrate and resolution, it will send the next HTTP request for that bitrate/resolution of the video segment. The server is stateless and can respond to clients' HTTP requests for particular segments at the requested bitrate/resolution.

Example System for Low Latency Video Streaming

FIG. 1 illustrates an example client-server system 100 for low latency video streaming, in accordance with an embodiment. The system 100 includes a live video packager 110 (e.g., an HDS-, HLS- or DASH-based packager or other suitable packager), a web server 120 that supports SPDY (e.g., Jetty), and a client computing device 130. The client computing device 130 includes a video player 132 (e.g., a DASH player or other suitable video player), and a browser 134 (e.g., a Google Chromium SPDY-based web browser or other suitable HTTP-compatible application). The web server 120 is in communication with the client 130 via a communications network 140, such as the Internet or another suitable wide area or local network. A live content source 112 supplies video content 114 to the packager 110. The live content source 112 can, in some embodiments, include or be operatively connected to a device that captures video and audio (e.g., via a camera and microphone, respectively) of an event, such as a sporting event, news conference, or stage production. In some embodiments, the packager 110 can be incorporated within the web server 120. In other embodiments, the packager 110 can be hosted on a server or other computing device (not shown) that is in communication with the web server 120 either directly or via the network 140. In some embodiments, a cache 150 can be associated with the client computing device 130 for storing HTTP resources 152, such as video content, pushed by the web server 120. The cache 150 may, for example, be used to temporarily store video segments as they are received. The video player 132 may then access the cache 150 and retrieve the video segments for playback.

In use, the system 100 provides a client-server environment for low latency video streaming using a server push strategy. The packager 110 is operative to package the video content 114 in any suitable manner for transmission to the client 130 (e.g., using a file segments-based scheme, such as DASH, HDS, etc.). Instead of triggering one request for each video segment, as is done with existing techniques, in an example embodiment the web server 120 can be configured to actively push each video segment after receiving the first request for the video stream following a pre-defined push strategy. In this way, it is possible for the client to reduce the number of HTTP requests to the server to a reasonably small number, e.g., one request for the entire video stream or one request for multiple video segments. Further, by allowing the server to push packaged content 152 to the client via HTTP, this example methodology eliminates the inversely proportional correlation between the segment duration and the number of requests for a certain length of video, which, as discussed above, effectively limits the latency reduction. Therefore, this example methodology can reduce the latency of live video streaming by reducing segment duration and by using a small number of requests to the server (e.g., one request) to improve the latency reduction.

The web server 120 may be configured with a referrer-based push strategy, where the server pushes all the content that has the same referrer in the HTTP header, upon receiving the request of the referrer URL. This push strategy works sufficiently well for the regular web content (e.g., content other than live video streaming, such as a web page), since most of the associated web content that needs to be pushed is embedded in the referred-to main resource. However, the referrer-based push strategy does not apply to video streaming, for at least the following reasons. First, existing video players request consecutive, independent video segments instead of embedded resources and, therefore, the pushed resource cannot rely on the referrer for video streaming. Second, with live video streaming, the content (e.g., the video segments) is generated in real-time and therefore cannot be pushed until it is generated. Third, in the existing server push scheme, the request for the main resource remains pending until all the requested content is pushed to the client. This does not meet the requirements of live video streaming, especially the low latency requirement.

Therefore, in accordance with an embodiment, the web server 120 can be configured for low latency video streaming using a push strategy that does not rely on referrers. For instance, instead of expecting a request of referrer URL, the web server 120 can employ a special push marker request from the client to determine the pushed resources. In some cases, the push marker can be a lightweight HTTP GET request that indicates the start and end segment numbers that the client 130 expects to receive via a push service from the web server 120. Further, in some cases, the client 130 can use the push marker as a one-way message without expecting or synchronously waiting for the response. In this manner, pushed content is not blocked by a pending push marker request, and accordingly live video streaming can begin as soon as the first video segment becomes available. Furthermore, in some cases, the timing in the execution of the push strategy can be varied during streaming, so that the server 120 can push the live video segments one-by-one as soon as they are generated by the content packager 110.

In an example embodiment, the video player 132 can be configured to send the special push marker request at certain times determined by the low latency scheme in use. Once the pushed content 152 is received by the browser 134, it can be stored in the cache 150 of the client 130. Then, when the client 130 requests the already pushed content 152, it can obtain the content 152 from its cache without having to send another request to the web server 120.

Example Push Strategies

Figure 2:
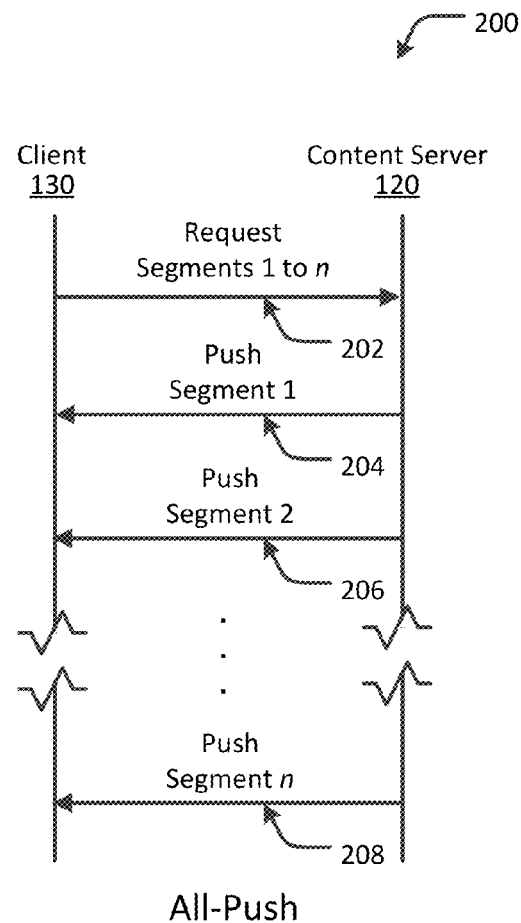
FIG. 2 illustrates a flow diagram for an example request-response video streaming push strategy, in accordance with an embodiment of the present invention.

FIG. 2 illustrates a flow diagram 200 for an example request-response video streaming push strategy, in accordance with an embodiment of the present invention. In this example, an all-push strategy is described. With an all-push strategy, the client 130 only issues one request for the entire live video stream. Upon receiving the request, the server 120 actively pushes all the video segments as soon as they are ready. The server 120 can continuously push segments to the client 130 in the absence of further requests for the video stream. For example, the client 130 may send, to the server 120, a request (202) for segments 1 to n of the video stream, where n represents the last segment of the video. For live video, n may be indeterminate until the live event has concluded. Further, n may vary depending on the length of each segment. In response to the request (202), the server 120 may push segment 1 (204), segment 2 (206), and so on through segment n (208) as each segment is generated or otherwise becomes available for pushing to the client 130.

Figure 3:
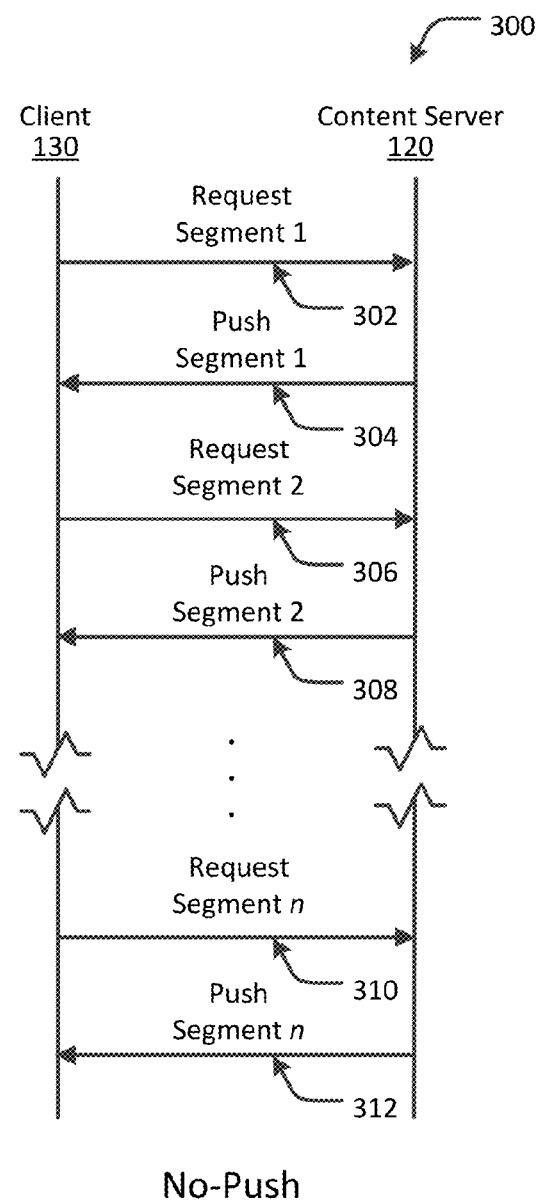
FIG. 3 illustrates a flow diagram for another example request-response video streaming push strategy, in accordance with an embodiment of the present invention.

FIG. 3 illustrates a flow diagram 300 for an example request-response video streaming push strategy, in accordance with an embodiment of the present invention. In this example, a no-push strategy is described. With a no-push strategy, the client 130 issues one request for each segment in the live video stream. Upon receiving the request, the server 120 pushes only the requested video segment. The server 120 will not continuously push segments to the client 130 in the absence of further requests for the video stream. For example, the client 130 may send, to the server 120, a request (302) for segment 1 of the video stream. In response to the request (302), the server 120 may push segment 1 (304) as the segment is generated or otherwise becomes available for pushing to the client 130. The client 130 may then send, to the server 120, a request (306) for segment 2 of the video stream, and further such requests for additional segments through segment n (310), where n represents the last segment of the video. The server 120 responds to each request (302, 306, 310) by pushing the corresponding segment to the client 130 (304, 308, 312).

Figure 4:
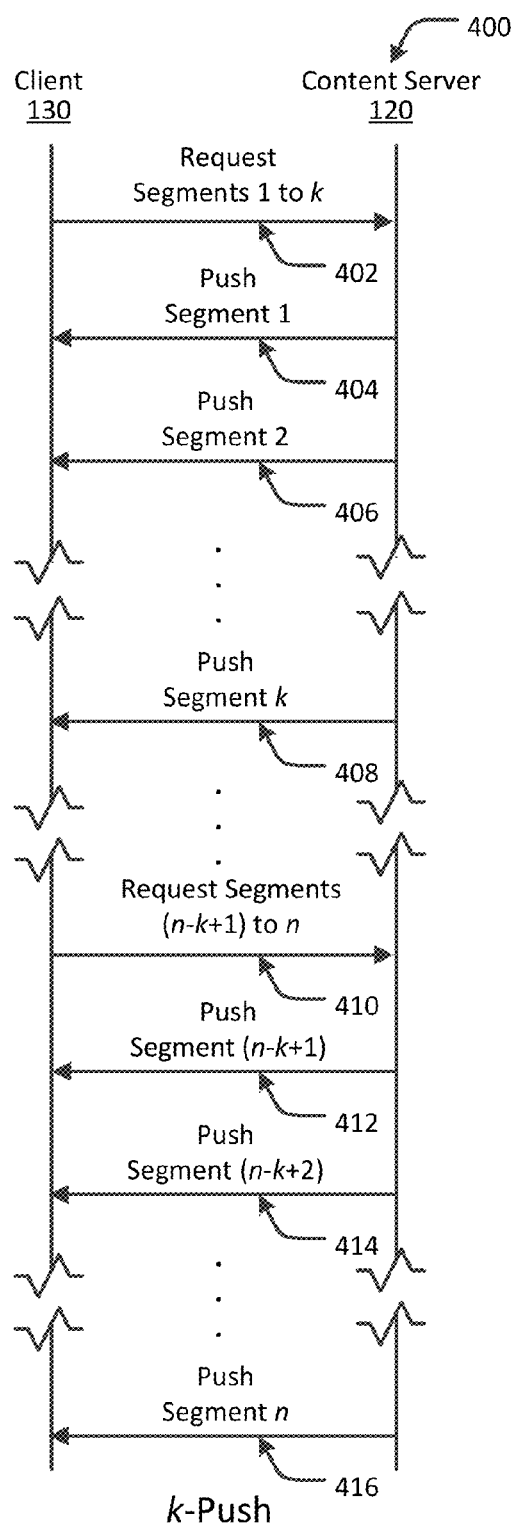
FIG. 4 illustrates a flow diagram for yet another example request-response video streaming push strategy, in accordance with an embodiment of the present invention.

FIG. 4 illustrates a flow diagram 400 for an example request-response video streaming push strategy, in accordance with an embodiment of the present invention. In this example, a k-push strategy is described. With a k-push strategy, the client 130 issues one request for the next available k segments of the live video stream. Upon receiving the request, the server 120 actively pushes the next k video segments as soon as they are ready. The server 120 can continuously push segments to the client 130 in the absence of further requests for the video stream, up to the $k^{th}$ segment. For example, the client 130 may send, to the server 120, a request (402) for segments 1 to k of the video stream. In response to the request (402), the server 120 may push segment 1 (404), segment 2 (406), and so on through segment k (408) as each segment is generated or otherwise becomes available for pushing to the client 130. At any time, the client 130 may send, to the server 120, a request (410) for another k segments of the video stream (e.g., segment n−k+1 to segment n). In response to the request (410), the server 120 may push the next k segments as each segment is generated or otherwise becomes available for pushing, up to and including segment n.

Example Server-Side and Client-Side Methodologies

Figure 5:
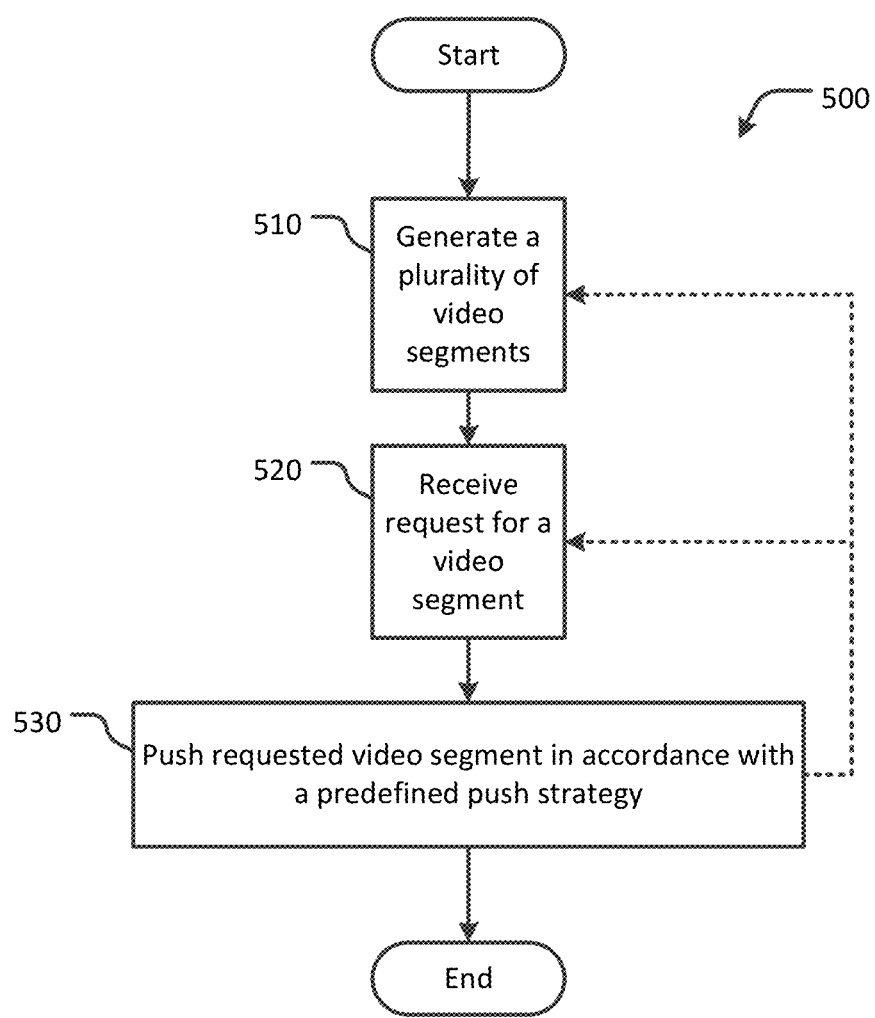
FIG. 5 shows an example server-side methodology for low latency live video streaming in accordance with an embodiment of the present invention.

FIG. 5 shows an example server-side methodology 500 for low latency video streaming in accordance with an embodiment. The method 500 may be implemented, for example, on the web server 120 of FIG. 1. The method 500 begins by generating (510) a plurality of video segments each representing a portion of multimedia content. The video segments can represent different consecutive time periods of the multimedia content. Each segment may, for example, be generated as the respective portions of the multimedia content are received from a live content source, such as the video source 112 of FIG. 1, or at a subsequent time. The method 500 continues by receiving, from a client computing device (e.g., the client 130 of FIG. 1), a request for at least one of the video segments (520). In some embodiments, only one HTTP request is received for at least two of the video segments. In response to the request, the method 500 continues by pushing (530) each of the requested segments to the client computing device in accordance with a predefined push strategy (e.g., an all-push, no-push, or k-push strategy, such as described above with respect to FIGS. 2, 3 and 4). In some embodiments, the at least two requested video segments are pushed without requiring separate HTTP requests from the client computing device for each of the video segments. The video segments can, in some cases, be pushed using a stateless communications protocol, such as HTTP 2.0. This process of receiving (520) and pushing (530) may continue indefinitely (e.g., until the entire video stream has been pushed). In some embodiments, the video segments can be pushed (530) asynchronously with respect to the receiving of the request (520). In some embodiments, the bitrate and resolution of each video segment can vary in response to a change in a network condition (e.g., a change in bandwidth availability, network traffic, CPU utilization, etc.). In some embodiments, the generating of video segments (510) can occur in parallel with the receiving of the request (520) and the pushing of the requested segments (530) that have already been generated. It will be understood that some or all of the functions variously described in this paragraph can be performed in any order and at any time by one or more different processors.

In some embodiments, the request can include an HTTP GET request that indicates the start and end segments within the plurality of video segments to be pushed to the client. The end segment can be the last of the video segments (e.g., as in an all-push strategy), or any segment other than the first or last video segment (e.g., as in a k-push strategy). Alternatively, the start and end segments of the request can be the same segment (e.g., as in a no-push strategy). Each of the video segments can be encoded according to a file fragments-based segmentation scheme, such as a MPEG Dynamic Adaptive Streaming over HTTP (DASH) and HTTP Dynamic Streaming (HDS), or a stream fragments-based segmentation scheme, such as HTTP Live Streaming (HLS).

Figure 6:
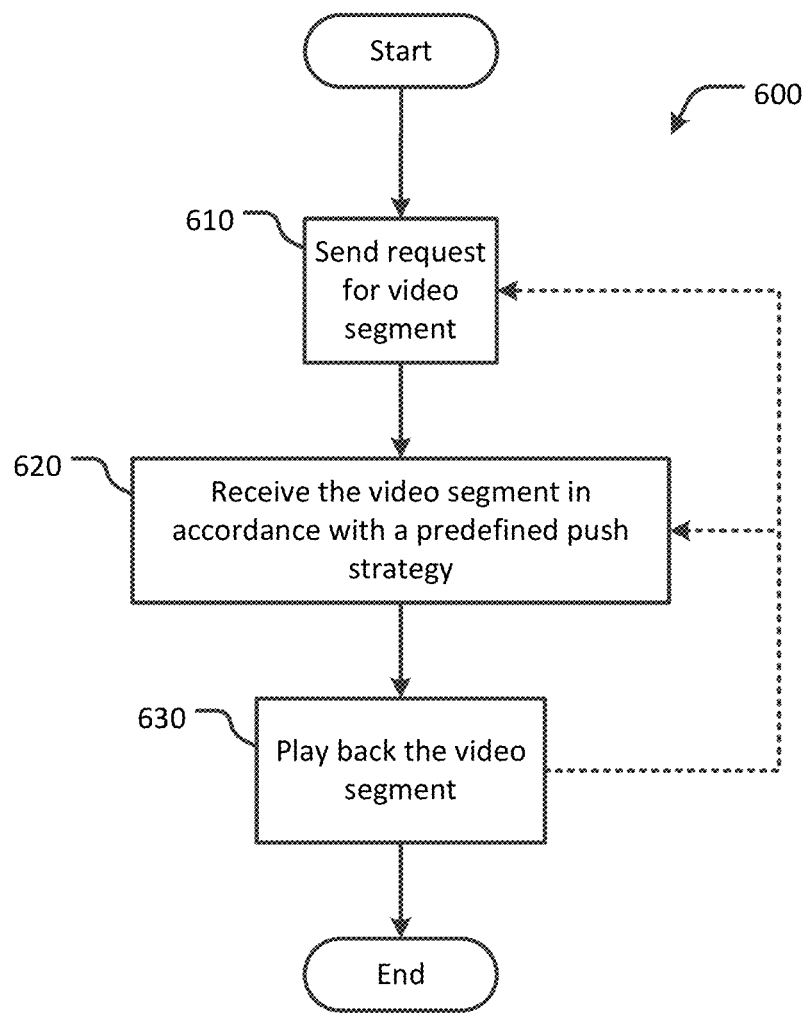
FIG. 6 shows an example client-side methodology for low latency live video streaming in accordance with an embodiment of the present invention.

FIG. 6 shows an example client-side methodology 600 for low latency video streaming in accordance with an embodiment. The method 600 may be implemented, for example, on the client computing device 130 of FIG. 1. The method 600 begins by sending (610), to a server (e.g., the web server 120 of FIG. 1), a request for a video segment. In some embodiments, only one HTTP request is sent to the server for at least two of the video segments. The video segment(s) represents a portion of multimedia content provided by, for example, the live content source 112 of FIG. 1. The video segment(s) can represent a different consecutive time period with respect to other video segments of the multimedia content. The video segment(s) may, for example, be generated as the respective portions of the multimedia content are received from a live content source, such as the video source 112 of FIG. 1, or at a subsequent time. The method 600 continues by receiving (620) the requested video segment(s) from the server in accordance with a predefined push strategy (e.g., an all-push, no-push, or k-push strategy, such as described above with respect to FIGS. 2, 3 and 4). In some embodiments, the at least two requested video segments are received without requiring separate HTTP requests from the client computing device for each of the video segments. The receiving can, in some cases, be performed using a stateless communication protocol, such as HTTP 2.0 The method continues by playing back (630) the multimedia content using the received video segment(s). This process of requesting (610), receiving (620) and playing back (630) (e.g., for a k-push or no-push strategy), or receiving (620) and playing back (630) (e.g., for an all-push strategy), may continue indefinitely (e.g., until the entire video stream has been received and played back). In some embodiments, the video segments can be received (620) asynchronously with respect to the sending of the request (610). In some embodiments, the bitrate and resolution of each video segment can vary in response to a change in a network condition (e.g., a change in bandwidth availability, network traffic, CPU utilization, etc.). Each of the video segments can be encoded according to a file fragments-based segmentation scheme, such as a MPEG Dynamic Adaptive Streaming over HTTP (DASH) and HTTP Dynamic Streaming (HDS), or a stream fragments-based segmentation scheme, such as HTTP Live Streaming (HLS). It will be understood that some or all of the functions variously described in this paragraph can be performed in any order and at any time by one or more different processors.

Example Computing Device

Figure 7:
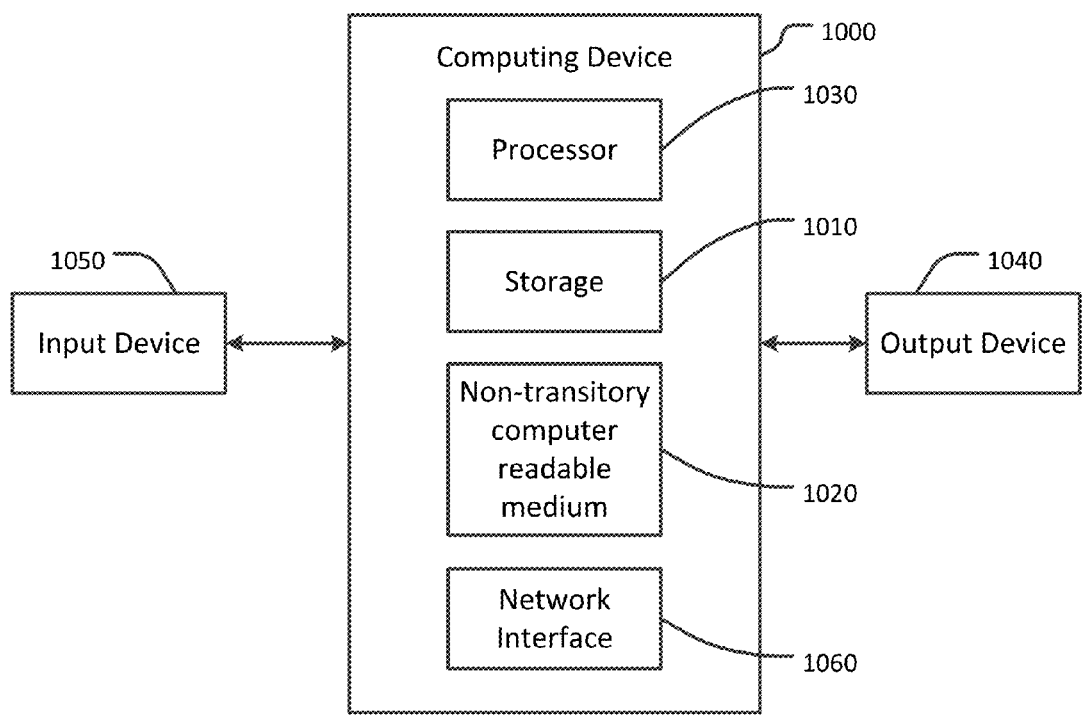
FIG. 7 is a block diagram representing an example computing device that may be used in accordance with an embodiment of the present invention.

FIG. 7 is a block diagram representing an example computing device 1000 that may be used to perform any of the techniques as variously described herein. For example, the packager 110, the web server 120, the client computing device 130, or any combination of these (such as described with respect to FIG. 1) may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described herein. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage device 1010 may include other types of memory as well, or combinations thereof. The storage device 1010 may be provided on the computing device or provided separately or remotely from the computing device. The non-transitory computer-readable media 1012 may include, but are not limited to, one or more types of hardware memory, non-transitory tangible media (for example, one or more magnetic storage disks, one or more optical disks, one or more USB flash drives), and the like. The non-transitory computer-readable media 1012 included in the computing device 1000 may store computer-readable and computer-executable instructions or software for implementing various embodiments. The computer-readable media 1012 may be provided on the computing device 1000 or provided separately or remotely from the computing device.

The computing device 1000 also includes at least one processor 1020 for executing computer-readable and computer-executable instructions or software stored in the storage device and/or non-transitory computer-readable media and other programs for controlling system hardware. Virtualization may be employed in the computing device 1000 so that infrastructure and resources in the computing device may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1030, such as a screen or monitor, which may display one or more user interfaces provided in accordance with some embodiments. The output device 1030 may also display other aspects, elements and/or information or data associated with some embodiments. The computing device 1000 may include other I/O devices 1040 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described herein. The computing device 1000 may include a network interface 1014 for communicating with other devices via a network, such as the Internet.

The computing device 1000 may run any operating system, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

As will be appreciated in light of this disclosure, the various modules and components of the system shown in FIG. 1, such as the packager 110, the video player 132 and the browser 134, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system, as described herein, can be performed by similar processors and/or databases in different configurations and arrangements, and that the depicted embodiments are not intended to be limiting. Various components of this example embodiment, including the user computing system, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Further Examples

Numerous embodiments will be apparent in light of the present disclosure, and features described herein can be combined in any number of configurations. One example embodiment provides a system having a storage and a processor operatively coupled to the storage. The processor is configured to execute instructions stored in the storage that when executed cause the processor to carry out a process. The process includes generating a plurality of video segments, each segment representing a portion of multimedia content, as the respective portions of the multimedia content are received from a live content source; receiving, from a client computing device, a request for at least one of the video segments; and pushing, from a server computer to the client computing device, the requested video segment or segments in accordance with a predefined push strategy. Another embodiment provides a non-transient computer-readable medium or computer program product having instructions encoded thereon that when executed by one or more processors cause the processor to perform one or more of the functions described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
generating a plurality of video segments, each segment representing a portion of multimedia content, as the respective portions of the multimedia content are received from a live content source;
receiving, from a client computing device, only one HTTP request for at least two of the video segments, the HTTP request indicating start and end segments within the plurality of video segments to be pushed to the client computing device; and
pushing, from a server computer to the client computing device, the at least two video segments in accordance with a predefined push strategy without requiring separate HTTP requests from the client for each of the video segments; and
subsequent to pushing the at least two video segments, varying the predefined push strategy based at least in part on a latency representing a time difference between generation of the at least two video segments and playback of the at least two video segments,
wherein the predefined push strategy is a k-push strategy and the end segment is any segment other than first and last segments of the plurality of video segments, and wherein varying the k-push strategy includes changing a total number of video segments pushed in response to receiving the HTTP request.

2. The method of claim 1, wherein the pushing of the at least two video segments is performed using a stateless communication protocol.

3. The method of claim 1, wherein the request includes an HTTP GET request that indicates the start and the end segments within the plurality of video segments to be pushed to the client computing device.

4. The method of claim 1, further comprising encoding each of the video segments according to at least one of a file fragments-based segmentation scheme and a stream fragments-based segmentation scheme.

5. The method of claim 4, wherein the segmentation scheme includes at least one of an HTTP Live Streaming (HLS) technique, an HTTP Dynamic Streaming (HDS) technique, a Smooth Streaming technique, and an MPEG Dynamic Adaptive Streaming over HTTP (DASH) technique.

6. The method of claim 1, wherein the video segments represent different consecutive time periods of the multimedia content.

7. The method of claim 1, further comprising varying at least one of the bitrate and resolution of at least one video segment in response to a change in a network condition.

8. The method of claim 1, wherein the pushing of the at least two video segments by the server computer is performed asynchronously with respect to the receiving of the request.

9. A computer-implemented method comprising:
sending, by a client computing device to a server computer, only one HTTP request for at least two of a plurality of video segments representing a portion of multimedia content, the HTTP request indicating start and end segments within the plurality of video segments to be pushed to the client computing device;
receiving, by the client computing device, the at least two video segments from the server computer in accordance with a predefined push strategy without requiring separate HTTP requests from the client computing device for each of the video segments; and
playing back, by the client computing device, the multimedia content using the at least two video segments,
wherein subsequent to playing back the at least two video segments, the predefined push strategy is varied based at least in part on a latency representing a time difference between a generation of the at least two video segments and the playback of the at least two video segments,
wherein the predefined push strategy is a k-push strategy and the end segment is any segment other than first and last segments of the plurality of video segments, and wherein varying the k-push strategy includes changing a total number of video segments pushed in response to receiving the HTTP request.

10. The method of claim 9, wherein the receiving of the at least two video segments is performed using a stateless communication protocol.

11. The method of claim 9, wherein the request includes an HTTP GET request that indicates the start and the end segments within a plurality of video segments to be received from the server computer.

12. The method of claim 9, further comprising decoding the requested video segment according to at least one of a file fragments-based segmentation scheme and a stream fragments-based segmentation scheme.

13. The method of claim 12, wherein the segmentation scheme includes at least one of an HTTP Live Streaming (HLS) technique, an HTTP Dynamic Streaming (HDS) technique, a Smooth Streaming technique, and an MPEG Dynamic Adaptive Streaming over HTTP (DASH) technique.

14. The method of claim 9, wherein at least one of the bitrate and resolution of the requested video segment is varied, with respect to other video segments received by the client computing device, in response to a change in a network condition.

15. The method of claim 9, wherein the receiving of the at least two video segments by the client computing device is performed asynchronously with respect to the sending of the request.

16. A system comprising:
a storage; and
a processor operatively coupled to the storage and configured to execute instructions stored in the storage that when executed cause the processor to carry out a process comprising:
generating a plurality of video segments, each segment representing a portion of multimedia content, as the respective portions of the multimedia content are received from a live content source;
receiving, from a client computing device, only one HTTP request for at least two of the video segments, the HTTP request indicating start and end segments within the plurality of video segments to be pushed to the client computing device;
pushing, from the system to the client computing device, the at least two video segments in accordance with a predefined push strategy without requiring separate HTTP requests from the client computing device for each of the video segments; and subsequent to pushing the at least two video segments, varying the predefined push strategy based at least in part on a latency representing a time difference between generation of the at least two video segments and playback of the at least two video segments, wherein the predefined push strategy is a k-push strategy and the end segment is any segment other than first and last segments of the plurality of video segments, and wherein varying the k-push strategy includes changing a total number of video segments pushed in response to receiving the HTTP request.

* * * * *